United States Patent [12]
Menzel et al.

(10) Patent No.: US 11,044,151 B2
(45) Date of Patent: Jun. 22, 2021

(54) METHOD FOR CREATING A CONFIGURATION FOR SETTING UP A CONFIGURATION-SPECIFIC WEB-BASED APPLICATION AND GENERATING THE CONFIGURATION-SPECIFIC WEB-BASED APPLICATION

(71) Applicant: Siemens Aktiengesellschaft, Munich (DE)

(72) Inventors: Thomas Menzel, Langensendelbach OT Braeuningshof (DE); Klaus Merkl, Herzogenaurach (DE); Sabine Ziegler, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 72 days.

(21) Appl. No.: 16/137,068

(22) Filed: Sep. 20, 2018

(65) Prior Publication Data

US 2019/0089591 A1 Mar. 21, 2019

(30) Foreign Application Priority Data

Sep. 21, 2017 (EP) .................................... 17192297

(51) Int. Cl.
*G06F 15/177* (2006.01)
*H04L 12/24* (2006.01)
*G05B 23/02* (2006.01)
*G05B 19/042* (2006.01)

(52) U.S. Cl.
CPC ...... *H04L 41/0813* (2013.01); *G05B 19/0428* (2013.01); *G05B 23/0216* (2013.01)

(58) Field of Classification Search
USPC .......................................................... 709/220
See application file for complete search history.

(56) References Cited

U.S. PATENT DOCUMENTS

| 7,457,853 | B1 * | 11/2008 | Chari | G06F 9/44505 |
| | | | | 709/217 |
| 8,769,059 | B1 * | 7/2014 | Chheda | H04L 41/0866 |
| | | | | 709/220 |
| 9,753,834 | B1 * | 9/2017 | Tang | G06F 11/3616 |
| 10,203,967 | B1 * | 2/2019 | Atta | G06F 13/4282 |
| 2004/0010429 | A1 * | 1/2004 | Vedula | H04L 41/18 |
| | | | | 709/220 |

(Continued)

FOREIGN PATENT DOCUMENTS

| CN | 102185927 | 9/2011 |
| CN | 104142630 | 11/2014 |

(Continued)

OTHER PUBLICATIONS

European Search Report for Patent No. 17192297 dated Mar. 27, 2018.

(Continued)

*Primary Examiner* — Anthony Mejia
(74) *Attorney, Agent, or Firm* — Cozen O'Connor

(57) ABSTRACT

Methods for creating a configuration for setting up a configuration-specific web-based application at least in a Cloud environment, wherein the configuration-specific web-based application processes data from a control unit of an automation system depending on the configuration in a Cloud environment.

19 Claims, 5 Drawing Sheets

(56) References Cited

U.S. PATENT DOCUMENTS

| | | | |
|---|---|---|---|
| 2009/0172101 A1* | 7/2009 | Arthursson | G06F 9/452 709/205 |
| 2010/0333092 A1* | 12/2010 | Stefansson | H04L 67/10 718/100 |
| 2012/0271927 A1* | 10/2012 | Shakirzyanov | G06F 9/5061 709/220 |
| 2014/0047107 A1 | 2/2014 | Maturana et al. | |
| 2014/0336786 A1 | 11/2014 | Asenjo et al. | |
| 2015/0113120 A1* | 4/2015 | Jacobson | G06N 5/04 709/224 |
| 2015/0134733 A1 | 5/2015 | Maturana et al. | |
| 2015/0168933 A1* | 6/2015 | Klein | G05D 23/1917 700/16 |
| 2015/0281319 A1 | 10/2015 | Maturana et al. | |
| 2015/0365275 A1* | 12/2015 | Iliev | H04L 41/5096 709/220 |
| 2017/0097632 A1* | 4/2017 | You | G05B 19/4183 |
| 2017/0257432 A1* | 9/2017 | Fu | H04L 67/2823 |
| 2017/0264486 A1* | 9/2017 | Angell | H04L 41/0806 |
| 2018/0046453 A1* | 2/2018 | Nair | G06F 8/60 |
| 2018/0170574 A1* | 6/2018 | Kahn | G07C 5/0841 |
| 2018/0183693 A1* | 6/2018 | Gidugu | H04L 43/0817 |
| 2018/0189344 A1* | 7/2018 | Akwule | G06F 16/954 |
| 2019/0199796 A1* | 6/2019 | Smith | H04L 67/2842 |
| 2020/0117477 A1* | 4/2020 | Aly | G06F 8/61 |
| 2020/0250742 A1* | 8/2020 | Aiglstorfer | G06Q 30/0241 |

FOREIGN PATENT DOCUMENTS

| | | |
|---|---|---|
| CN | 104636421 | 5/2015 |
| CN | 104950837 | 9/2015 |
| CN | 106789432 | 5/2017 |
| EP | 2801941 | 11/2014 |
| EP | 2924571 | 9/2015 |
| EP | 3121667 | 1/2017 |

OTHER PUBLICATIONS

Office Action dated Feb. 3, 2021 issued in Chinese Patent Application No. 201811104119.8.

* cited by examiner

METHOD FOR CREATING A CONFIGURATION FOR SETTING UP A CONFIGURATION-SPECIFIC WEB-BASED APPLICATION AND GENERATING THE CONFIGURATION-SPECIFIC WEB-BASED APPLICATION

BACKGROUND OF THE INVENTION

1. Field of the Invention

The invention relates to a method for creating a configuration for setting up a configuration-specific web-based application and to a method for generating the configuration-specific web-based application in a Cloud environment, as well as a corresponding computer program product.

2. Description of the Related Art

Manufacturers and operators of production machines are faced with the challenge of controlling and evaluating processes running on production machines, such as packaging machines or forming machines or injection molding machines. The recording of data and the evaluation of the recorded data are intended to generate added value. The analyses of such data is advantageously intended to be used for monitoring process variables or the monitoring of processing sequences or the prediction of maintenance tasks.

In the present era of digitization in industrial automation or production, the computing capacities on servers in a "Cloud environment" can be used for such analyses, evaluations and display functions. In this process, a production machine sends locally acquired data into the Cloud and has the data processed there. This means that external computing capacities of a third-party, available outside the manufacturing or production facility, can be used. In the Cloud, web-based applications are available that are designed to be used for the processing, analysis, storage, security, or display and visualization of the data by a user, in this case the machine user.

It is known that a general or general-purpose application is available in the Cloud, which is designed to be generally valid for the evaluation of data so that a wide range of values from a wide variety of machines from many sectors of industry and application cases can be processed. If a user or customer then wishes to use an application in the Cloud, which is tailored to the specific requirements of their machine or system, then the possibility remains for the user to make changes in the Cloud environment him/herself. This requires expertise with respect to programming and implementation in the Cloud, which is not necessarily available in a mechanical engineering facility. The adaptation to a specific configuration of a production machine in the Cloud is therefore not possible without considerable effort on the part of a user of a general or universal application in the Cloud.

It is also known to have a customer-specific application developed by a Cloud provider. In this way, an application that is customized to the requirements of a system or machine can be developed, which is tailored to the specific application of the customer. This involves considerable development effort, which the customer must obtain from the Cloud provider. This requires the machine operator to send a plurality of system- or application-specific data to the Cloud service, which are to be taken into account in the development of the applications. At the same time, this variant is associated with a degree of inflexibility, because in the event of any change in the requirements placed on the web-based application the user must contact the Cloud provider in order to obtain or be able to use an update of the application.

SUMMARY OF THE INVENTION

In view of the foregoing, it is an object of the present invention to provide a method and a computer program product corresponding to the method, which enable a simpler and more flexible usage of a Cloud-based application for processing data from a control unit of an automation system for specific configurations.

This and other objects and advantages are achieved in accordance with the invention by a method for creating a configuration for setting up a configuration-specific web-based application, where the configuration-specific web-based application is configured to process data from a control unit of an automation system as a function of the configuration in a Cloud environment, having the following steps of generating configuration data on the control unit, and deploying the configuration data on the control unit for sending into the Cloud environment, where with the help of the configuration data the setting up of the configuration-specific web-based application can be performed by a general application.

On a control unit, for example, a motion controller for an injection molding machine, configuration data are created. The configuration data relate to the functions for data processing or data display that are required or desired on the controller. The required expertise is available based on the familiarity of a production machine manufacturer or production machine user with their own machine. The configuration data specify the manner in which data from the machine are to be processed by an application in order to obtain a meaningful evaluation via the application. Depending on which recording of values, for example, "Key Performance Indicators", are needed for a high-quality analysis of processes in a machine controlled by the controller, an application specifically tailored thereto can be requested or required from the Cloud by the user on the automation system.

For setting up the configuration-specific web-based application the general application, requires the configuration data in order to be able to implement the specific requirements on the data processing and display of data, such as calculated values, tailored to the specific application.

The configuration creation for a web-based application is therefore relocated to a controller on the part of a production plant or machine manufacturer, instead of this being performed in the Cloud. The existing control engineering knowledge of the in-house employees can be used in an advantageous way, without the need for additional knowledge in Cloud programming.

In accordance with one embodiment, the generation and deployment of the configuration data are performed once during an initialization phase or in a specifiable cycle during an operation of the control unit. In particular, the configuration data are created at the same time as an initial installation of a machine of the automation system, in particular a production machine. In the event of a change in the desired configuration-specific application, a new configuration data record can also be created during operation of the machine and sent to the Cloud for an update of the customer-specific Cloud application.

In accordance with another embodiment, one or more function blocks available within the control unit are used to generate the configuration data. In particular, an input environment of the controller, such as a motion controller, offers pre-generated function blocks, which facilitate the creation of the configuration data.

In accordance with a further embodiment, from the configuration data the configuration-specific web-based application derives rules for the processing, evaluating or displaying data, in particular actual values, to be evaluated via the application. Using the configuration data, it is possible to specify the rule according to which data, such as actual values that are recorded in the production machine, are to be processed or to be evaluated, or the layout according to which determined values are to be displayed. In an advantageous way therefore, display and monitoring or maintenance processes are enabled that are based on particular customer-specific standards. For example, in some sectors the "Weihenstephan standard" or the OMAC guidelines are established, according to which customers would like to perform their analyses and displays.

In accordance with another embodiment, the configuration data are provided in a meta-language-based document, in particular in an XML format. It is important that the configuration data are transferred in a format that can be interpreted by the general application on the Cloud.

In accordance with an embodiment, in addition to the configuration data, data to be processed are provided by the configuration-specific web-based application. These are, for example, actual values. These are determined, for example, in a running process, via sensors. The data can be used by the application running in the Cloud as input to perform the analysis, storage or display.

In accordance with a further embodiment, the data to be processed are provided and sent to the Cloud environment by the control unit in a cyclical manner. These data to be evaluated are transmitted into the Cloud, such as in a short cycle, while the configuration data are only provided on a long cycle.

In accordance with another embodiment the configuration data are provided to a gateway for forwarding to the Cloud environment. In particular, "IoT" gates or Internet-of-Things gates can be used, which act as an interface between a manufacturing network and a Cloud network.

It is also an object of the invention to provide a computer program product with a computer program, having means for performing the method for creating a configuration for setting up a configuration-specific web-based application in accordance with any of the described embodiments, if the computer program is executed on a program-controlled control device.

A computer program product, such as a computer program means, can, for example, be provided or supplied as a storage medium, such as a memory card, USB stick, CD-ROM, DVD, or else in the form of a downloadable file from a server to a network. This may be effected, for example, in a wireless communication network by the transmission of a corresponding file with the computer program product or the computer program means. A control device with a processor or microprocessor or similar is particularly suitable as a program-controlled device.

For example, the creation of the configuration for the configuration-specific application can occur on a motion controller, such as a Simotion or Simatik supplied by Siemens, on a programmable logic controller (PLC).

As stated it is an object of the invention to provide a method for generating a configuration-specific web-based application in a Cloud environment, where in an alternative embodiment the method includes the following steps of receiving configuration data via a general application in the Cloud environment from a control unit of an automation system outside the Cloud environment, interpreting the configuration data of the general application, and generating the configuration-specific web-based application as a function of configuration data.

In an advantageous way, a user of Cloud services can already extract added value from the data sent to the Cloud immediately on first connection to the Cloud, because the Cloud generates a self-configuring application that is tailored to the customer.

The interplay of configuration creation on the control unit, on the one hand, and the interpretation and implementation of the configuration data for configuring and creating a configuration-specific application by the Cloud on the other hand, allows the simple and flexible use of a configuration-specific web-based application for a user of a machine in an automation system. Thus, the two aspects of the invention presented are closely interlinked processes, which despite being implemented on different components nevertheless show dependencies in their action.

In accordance with an embodiment, the configuration data are interpreted by a meta-language, in which the configuration data are formatted, being processable, i.e., known, on the general application. For example, an XML document that comprises the configuration data is provided as an interpretable format for the general application in the Cloud.

In accordance with an embodiment, in addition to the configuration data, data to be evaluated by the configuration-specific web-based application, i.e., actual values, are received from the control unit by the general application in the Cloud environment. In particular, actual data are sent into the Cloud in short cycles and processed there at regular intervals and with as little delay as possible.

In accordance with another embodiment, a user of the control unit receives a processing or analysis or display of the data via the configuration-specific web-based application, which is definable by the configuration data on the control unit. The platform for the configuration creation for a configuration-specific web application is advantageously relocated into a control unit. The creation of the application itself is then performed in the Cloud.

In accordance with yet another embodiment, the configuration data are received from a gateway, where the gateway receives the configuration data from the control unit.

It is also an object of the invention to provide a non-transitory computer program product with a computer program which has means for implementing the method in accordance with the disclosed embodiments, if the computer program is executed on a program-controlled device in the Cloud environment.

BRIEF DESCRIPTION OF THE DRAWINGS

The invention is described in further detail below by reference to the figures, in which.

DETAILED DESCRIPTION OF THE EXEMPLARY EMBODIMENTS

Figure 1:
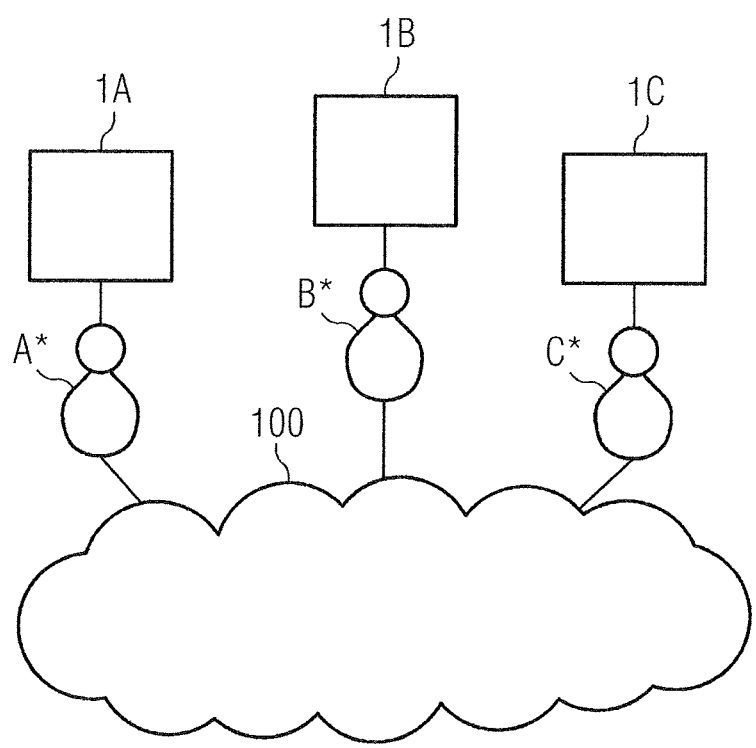
FIG. 1 is a schematic diagram illustrating web applications used in a Cloud environment in accordance with the prior art.

In the figures, functionally equivalent elements are provided with the same reference numerals, unless otherwise indicated.

FIG. 1 illustrates a prior art scenario, in which three different applications 1A, 1B, 1C are required for three different users A*, B*, C* of a Cloud service in industrial production from different sectors and application areas. These three different applications 1A, 1B, 1C are specifically developed by the Cloud provider for the three different customers A*, B*, C*. Prior to the development, it is necessary to clarify which customer requires which features of the web-based application. A web developer of the Cloud provider develops the customer-specific applications accordingly. Each user A*, B*, C* receives an application 1A, 1B, 1C customized to their needs, which is configured according to the requirements specified in advance.

Figure 2:
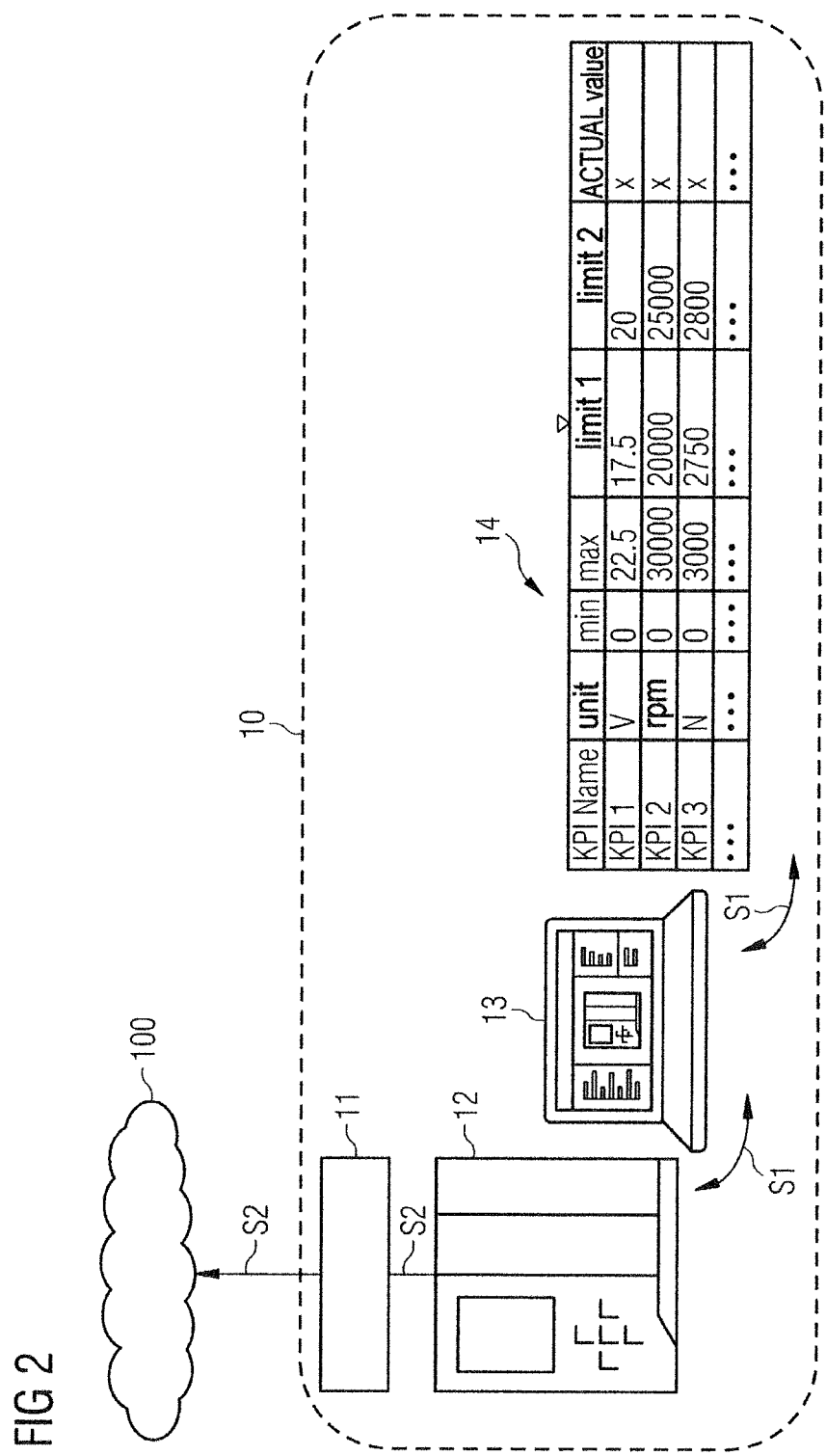
FIG. 2 is a schematic diagram illustrating the method in accordance with a first embodiment of the invention.

FIG. 2 describes a first embodiment of the invention, which illustrates the creation of a configuration for a configuration-specific web-based application on a control unit 10. The control unit 10 is provided, for example, on an injection molding machine or a forming machine or a packaging machine.

A developer familiar with the development modules and the programming language of the controller 10 produces a con-figuration which will form the basis of the web-based application to be used in the Cloud 100. On the basis of this configuration, it is then specified how data processing is to be performed by the application and how measured or detected or forecast data are to be displayed. To this end, in a first step S1, configuration data is generated on the control unit 10. This is performed, for example, using a PC 13, which is configured for the installation or maintenance of a motion controller 12. In a second step S2, this data is provided as a data record on the control unit 10 for sending to the Cloud environment 100. For example, the control unit 10 sends the configuration data to the Cloud 100 via an IoT gate 11.

For example, during initial operation of a forming machine and the configuration of the motion controller of the forming machine, the configuration for the web application is created. Thus, parameters that are important for the functionality of the web application customized to the user project, can already be compiled in a table 14 during the project creation stage. For example, different metrics or KPIs are defined, or limits or thresholds are specified for different relevant parameters of a machine, a process or a plant. At the same time, it is also possible to store actual values which, as a rule, are transmitted to the Cloud 100 separately from the configuration data, however.

With the configuration data, specifications are provided to a general app in the Cloud environment as to how actual values and metrics should be evaluated and displayed. The configuration-specific web-based application, which can be set up in the Cloud environment via the configuration data, is therefore specifically aligned to the development of the controller system or production machine.

Figure 3:
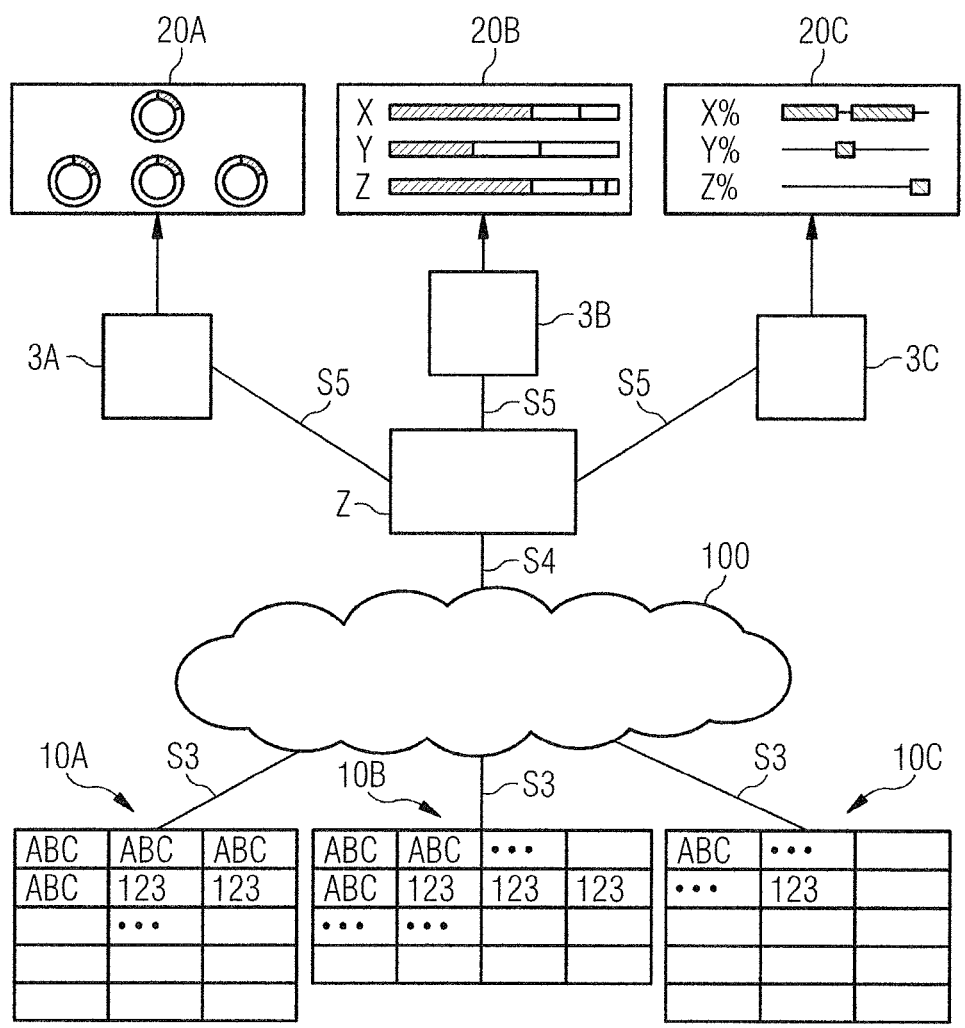
FIG. 3 a schematic diagram to illustrate the method in accordance with a further embodiment of the invention.

FIG. 3 illustrates a further embodiment of the invention, where FIG. 3 schematically shows how multiple configuration-specific web-based applications 3A, 3B, 3C are generated on a general application Z in a Cloud environment 100. For example, the Cloud environment can be the Mind-Sphere, a Cloud service provided by the Siemens company. Here, the application-specific configuration data 10A, 10B, 10C from the various projects are sent to the Cloud environment 100. These may already be customized to the respective application or the specific development of the respective controller. In the Cloud environment 100, the interpretation S4 of the configuration data is performed.

To achieve this, the meta-language that was used for gen-erating the configuration data 10A, 10B, 10C in the respective controller at the customer's premises is known to the general application Z in the Cloud environment 100, thus enabling generation of the respective configuration-specific web-based application 3A, 3B, 3C. This particular configuration-specific web-based application 3A, 3B, 3C has, on the one hand, the functionality required by each user in the configuration data 10A, 10B, 10C, in terms of the processing of data that is received in the Cloud environment 100 from the respective manufacturing plant or a user's controller or machine. In addition, the display or visualization that an end-user can cause to be output or displayed via the configuration-specific web-based application 3A, 3B, 3C, is also performed in a very specific way. For example, using configuration data it is possible to request the processing and display 20A, 20B, 20C of actual values in accordance with a standard, such as the Weihenstephan standard or the OMAC guidelines. In other embodiments, a customer-specific or other common industry standard for the presentation of the results of the respective web-based application 3A, 3B, 3C can be used.

Advantageously, an independent configuration of applications in the Cloud is aligned to different applications based on specifications using configuration data, which were created outside of the Cloud environment in a controller at the customer's site. The knowledge and expertise and the experience of employees of an application user in the field of control engineering can be used to advantage, without the need for additional knowledge in Cloud programming or web programming.

The invention thus enables reduced complexity to be combined with increased flexibility, by allowing the configuration-specific application to be adapted at regular intervals, a process which can be initiated by the user or customer themselves. Even when connecting a machine or the controller for a machine to the Cloud environment for the first time, i.e., when using a Cloud service that provides an application for the first time, a high added value can be achieved, by allowing a user- or industry-specific application to be used instead of a general application but without the need for any programming of this app by the Cloud provider.

Although the invention has been illustrated and described in greater detail by means of the exemplary embodiment, the invention is not restricted by the configurations and examples disclosed and other variations can be derived therefrom by the person skilled in the art without departing from the scope of protection of the invention.

Figure 4:
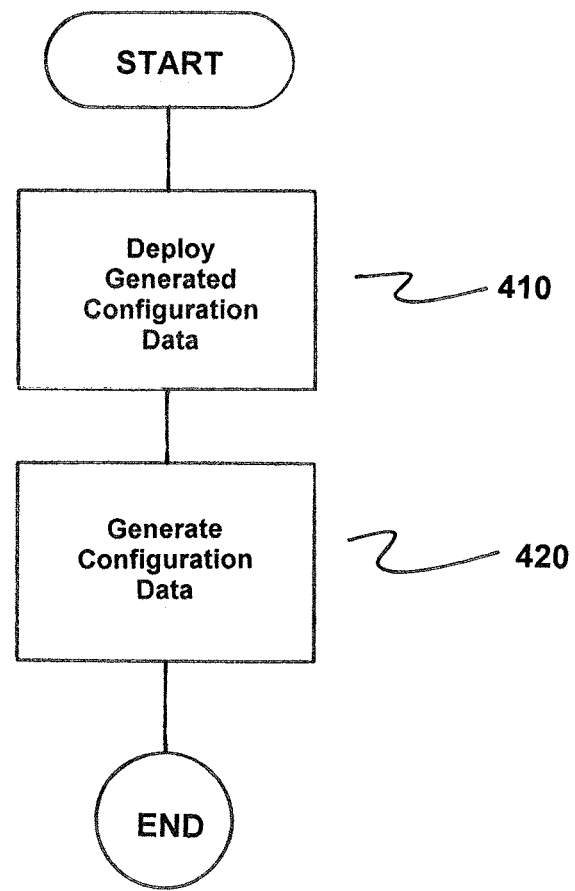
FIG. 4 is a flowchart of the method in accordance with the invention.

FIG. 4 is flowchart of a method for creating a configuration for setting up a configuration-specific web-based application, where the configuration-specific web-based application processes data from a control unit of an automation plant depending on a configuration in a Cloud environment. The method comprises generating (S1) configuration data on the control unit, as indicated in step 410.

Next, the generated configuration data on the control unit for sending into the Cloud environment is deployed (S2), as indicated in step 420. Here, setting up of the configuration-specific web-based application is performed by a general application aided by the generated configuration data.

Figure 5:
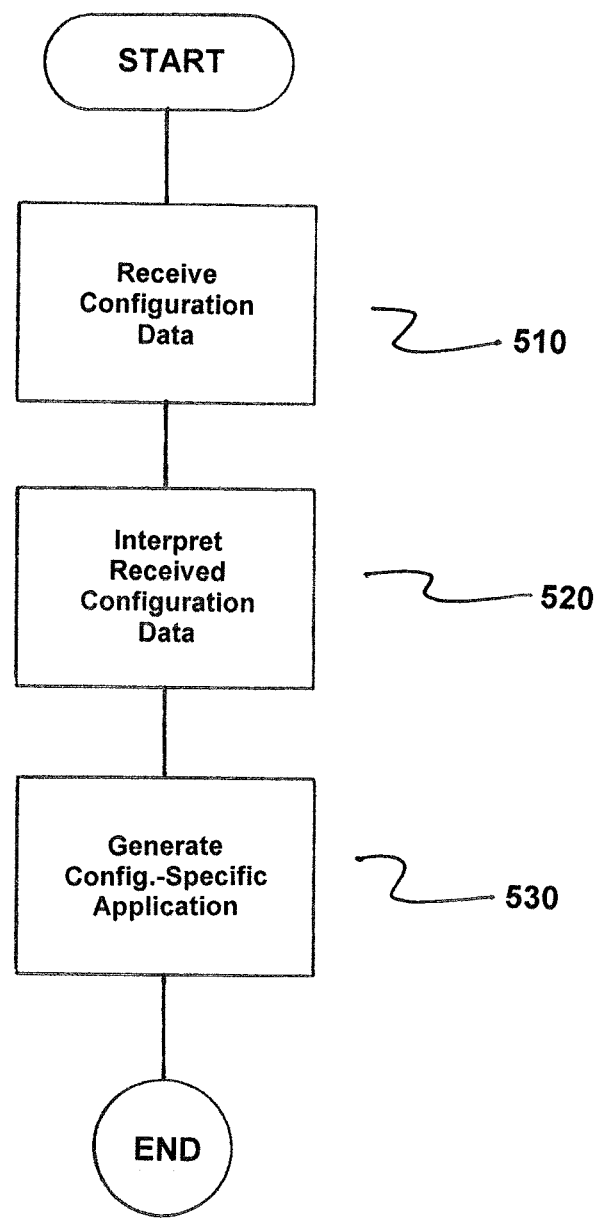
FIG. 5 is a flowchart of the method in accordance with the invention.

FIG. 5 is a flowchart of a method for generating a configuration-specific web-based application in a Cloud environment. The method comprises receiving (S3) configuration data via a general application in the Cloud environment from a control unit of an automation system outside the Cloud environment, as indicated in step 510.

Next, the received configuration data in the general application is interpreted (S4), as indicated in step 520.

Next, the configuration-specific application depending on the interpretation of the received configuration data is generated (S5), as indicated in step 530.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for creating a configuration for setting up a configuration-specific web-based application, the configuration-specific web-based application processing data from a control unit of an industrial manufacturing system depending on a configuration in a Cloud environment, the method comprising:
    generating configuration data on the control unit of the industrial manufacturing system; and
    deploying the generated configuration data on the control unit of the industrial manufacturing system for sending into the Cloud environment, setting up of the configuration-specific web-based application being performed by a general application aided by said generated configuration data;
    wherein said generating and deploying of the configuration data is performed once during a first initialization phase commenced at an initial installation of the industrial automation system.

2. The method as claimed in claim 1, wherein said generating and deploying of the configuration data being additionally performed in a specifiable cycle during an operation of the control unit.

3. The method as claimed in claim 1, wherein at least one function block available within the control unit are utilized to generate the configuration data.

4. The method as claimed in claim 2, wherein at least one function block available within the control unit are utilized to generate the configuration data.

5. The method as claimed in claim 1, wherein the configuration-specific web-based application derives rules for at least one of (i) processing data, (ii) evaluating data and (ii) displaying data from the configuration data to be evaluated via the configuration-specific web-based application.

6. The method as claimed in claim 5, wherein at least one of the (i) processing data, (ii) evaluating data and (ii) displaying data comprises actual values.

7. The method as claimed in claim 1, wherein the configuration data are provided in a meta-language-based document.

8. The method as claimed in claim 7, wherein the meta-language-based document is in an XML format.

9. The method as claimed in claim 1, wherein in addition to the configuration data, data to be processed are provided by the configuration-specific web-based application.

10. The method as claimed in claim 9, wherein the data to be processed by the control unit are deployed and sent to the Cloud environment at least one of (i) in a cyclical manner and (ii) as a function of a value change.

11. The method as claimed in claim 1, wherein the configuration data are provided to a gateway for forwarding to the Cloud environment.

12. A non-transitory computer program product encoded with a computer program which, when executed on a program-controlled control device, causes creation of a configuration for setting up a configuration-specific web-based application, the configuration-specific web-based application processing data from a control unit of an industrial manufacturing system depending on a configuration in a Cloud environment, the computer program comprising:
    program code for generating configuration data on the control unit of the industrial manufacturing system; and
    program code for deploying the generated configuration data on the control unit of the industrial manufacturing system for sending into the Cloud environment, setting up of the configuration-specific web-based application being performed by a general application aided by said generated configuration data;
    wherein said generating and deploying of the configuration data is performed once during a first initialization phase commenced at an initial installation of the industrial automation system.

13. A method for generating a configuration-specific web-based application in a Cloud environment, comprising;
    receiving configuration data via a general application in the Cloud environment from a control unit of an industrial manufacturing system outside the Cloud environment;
    interpreting the received configuration data in the general application; and
    generating the configuration-specific application depending on the interpretation of the received configuration data;
    wherein said generating and deploying of the configuration data is performed once during a first initialization phase commenced at an initial installation of the industrial automation system.

14. The method as claimed in claim 13, wherein the configuration data are interpreted by a meta-language, in which the configuration data are formatted, being provided on the general application.

15. The method as claimed in claim 13, wherein in addition to the configuration data, data to be evaluated by the configuration-specific web-based application are received by the general application in the Cloud environment from the control unit.

16. The method as claimed in claim 14, wherein in addition to the configuration data, data to be evaluated by the configuration-specific web-based application are received by the general application in the Cloud environment from the control unit.

17. The method as claimed in claim 15, wherein the date to be evaluated by the configuration-specific web-based application comprises actual values.

18. The method as claimed in claim 16, wherein the date to be evaluated by the configuration-specific web-based application comprises actual values.

19. A non-transitory computer program product encoded with a computer program which, when executed on a program-controlled device in a Cloud environment, generation of a configuration-specific web-based application in the Cloud environment, the computer program comprising:
   program code for receiving configuration data via a general application in the Cloud environment from a control unit of an industrial manufacturing system outside the Cloud environment;
   program code for interpreting the received configuration data in the general application; and
   program code for generating the configuration-specific application depending on the interpretation of the received configuration data;
   wherein said generating and deploying of the configuration data is performed once during a first initialization phase commenced at an initial installation of the industrial automation system.

* * * * *